United States Patent
Aditya et al.

(10) Patent No.: US 7,596,650 B1
(45) Date of Patent: Sep. 29, 2009

(54) INCREASING AVAILABILITY OF INPUT/OUTPUT (I/O) INTERCONNECTIONS IN A SYSTEM

(75) Inventors: Vikas Aditya, Portland, OR (US); Donald L. Faw, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 11/526,432

(22) Filed: Sep. 25, 2006

(51) Int. Cl.
  *H05K 7/10* (2006.01)
  *G06F 13/36* (2006.01)
  *G06F 15/00* (2006.01)
  *G06F 15/76* (2006.01)

(52) U.S. Cl. .......... 710/301; 710/306; 710/11; 712/29

(58) Field of Classification Search .......... 710/2, 710/8, 11, 62, 72, 300, 301, 305–306, 315; 712/11, 15, 29; 340/425.1
See application file for complete search history.

(56) References Cited

U.S. PATENT DOCUMENTS

| | | | |
|---|---|---|---|
| 6,009,488 A | 12/1999 | Kavipurapu | 710/105 |
| 6,998,870 B1 * | 2/2006 | Gulick et al. | 326/30 |
| 2002/0184328 A1 * | 12/2002 | Richardson et al. | 709/213 |
| 2003/0093598 A1 * | 5/2003 | Park | 710/63 |
| 2005/0243531 A1 * | 11/2005 | Kulpa et al. | 361/783 |
| 2006/0129732 A1 * | 6/2006 | Tsai et al. | 710/305 |
| 2006/0136644 A1 | 6/2006 | Martin et al. | 710/302 |
| 2007/0143520 A1 * | 6/2007 | Yang et al. | 710/306 |

* cited by examiner

*Primary Examiner*—Thomas J Cleary
(74) *Attorney, Agent, or Firm*—Trop, Pruner & Hu, P.C.

(57) ABSTRACT

In one embodiment, the present invention includes an apparatus having a first interface to process data for communication according to at least first and second protocols, a second interface to process data for communication according to at least the first and second protocols, and a common buffer coupled to the first and second interfaces to temporarily store the data. In another embodiment, a passive interposer includes at least one interconnect. The passive interposer can be coupled to an unpopulated socket of a system to route signals from a first processor to a device coupled to the unpopulated socket. Other embodiments are described and claimed.

11 Claims, 4 Drawing Sheets

INCREASING AVAILABILITY OF INPUT/OUTPUT (I/O) INTERCONNECTIONS IN A SYSTEM

BACKGROUND

Embodiments of the present invention relate to processor-based systems, and more particularly to such systems including multiple components in communication with each other.

Modern computer systems are designed around a processor. Increasing efficiencies in semiconductor processing (e.g., shrinking device sizes in advanced technology nodes) provide opportunities for increasing functionality. Many current systems are configured as dual processor (DP) or multiprocessor (MP)-based systems in which two or more processors are present. Typically, such processors may be adapted within processor sockets of a motherboard or other circuit board of a system. Rather than a traditional shared bus topology, advanced platforms are being developed using new protocols for connecting processors and chipset components of a platform. Some of these protocols are implemented using a point-to-point (PTP) interconnect model that provides a high bandwidth. Coherent and scalable interconnects connect components such as processors, hub agents, memory and other system components together.

In addition to inter-processor communications which may be according to a given protocol, such as a PTP interconnect-based protocol, a system may be configured to include or have support for multiple peripheral devices such as input/output (I/O) or other such devices. Oftentimes a given system implementation will include support for N number of I/O slots. Because the industry trend is to integrate I/O capabilities on a processor, one option for providing such I/O capability is to include all sufficient pins and corresponding circuitry within a processor to support all N slots via a single processor. However, such an implementation is not cost effective and is further wasteful of chip area, as typically DP and MP systems are configured with more than one processor in the system. For example, if a MP system includes M processors, support for only N/M number of I/O slots would need to be present in each processor. However, at the same time there can be some configurations of DP or MP systems in which not all M processors are present.

DETAILED DESCRIPTION

Figure 1:
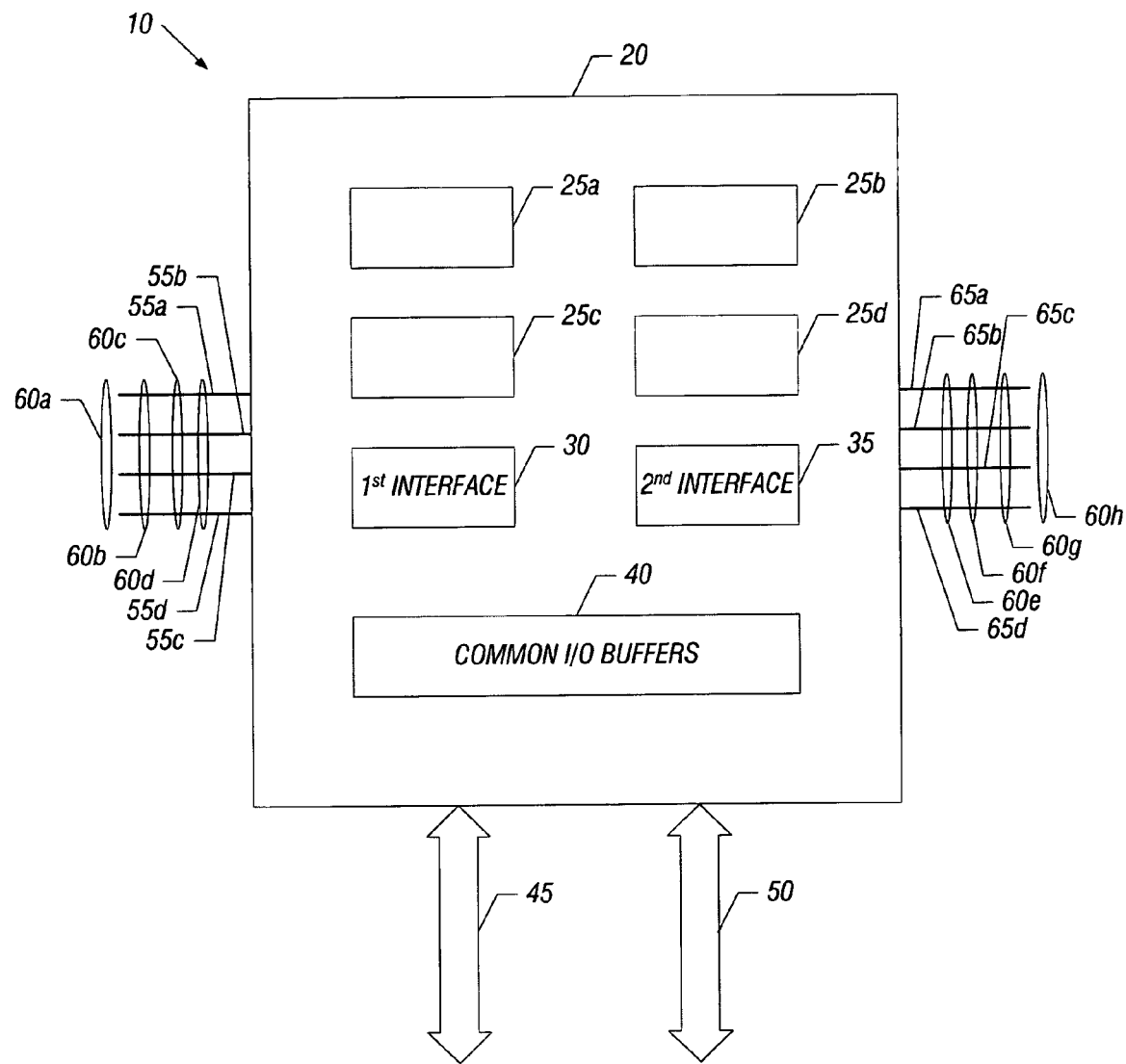
FIG. 1 is a block diagram of a system in accordance with one embodiment of the present invention.

In various embodiments, different components of a system such as processor sockets or other such components may include multiple interfaces that can be reconfigurable to enable communication according to different protocols. Furthermore, such components may also include a common buffer structure such as a common input/output (I/O) buffer set to enable incoming/outgoing data to be temporarily stored in a common buffer set, when that data may be of different protocols depending on a given system implementation. Furthermore, to enable communication with a wide variety of devices potentially present in a system, a passive interconnect structure may be located in a system to provide interconnections when the system is not fully populated, for example, when one or more processor sockets of the system are unpopulated.

In many embodiments, systems may be implemented using a point-to-point interconnect (PTP) protocol. In a PTP system, agents are interconnected via serial links or interconnects which couple one agent to another. The agents may correspond to processor sockets, memory, hub agents such as chipset components, e.g., memory controller hubs (MCHs), input/output (I/O) controller hubs (ICHs), other processors and the like. The agents of such systems communicate data via an interconnection hierarchy that typically includes a protocol layer, an optional routing layer, a link layer, and a physical layer. This interconnection hierarchy may be implemented in an interface of each agent. That is, each agent may include at least one interface to enable communication, and certain agents such as processor sockets may include multiple interfaces.

The protocol layer, which is the highest layer of the interconnection hierarchy, institutes the protocol, which in one embodiment may be a so-called common system interconnect (CSI) protocol, although the scope of the present invention is not so limited. The protocol layer is a set of rules that determines how agents communicate. For example, the protocol sets the format for a transaction packet, which may correspond to the unit of data that is communicated between nodes. Such a packet typically contains information to identify the packet and its purpose (e.g., whether it is communicating data in response to a request or requesting data from another node).

The routing layer determines a path over which data is communicated between nodes. Because each node is not connected to every other node, there are multiple paths over which data may be communicated between two particular nodes. The link layer receives transaction packets from the protocol layer and communicates them in a sequence of flits. The link layer handles flow control, which may include error checking and encoding mechanisms. Through the link layer, each node keeps track of data sent and received and sends and receives acknowledgements in regard to such data.

Finally, the physical layer may include the actual electronics and signaling mechanisms at each node. In a point-to-point, link-based interconnection scheme, there are only two agents connected to each link. The physical layer and link layer include mechanisms to deal with high-speed serial links with relatively high bit error rates, high latency and high round trip latency.

In this hierarchy, the link layer may transmit data in flits (which may be 80 bits in one embodiment), which are then decomposed into phits (e.g., ¼ of a flit length) at the physical layer and are communicated over a PTP interconnect to the physical layer of a receiving agent. The received phits are integrated into flits at the physical layer of the receiving agent and forwarded to the link layer of the receiving agent, which combines the flits into transaction packets for forwarding to the protocol layer of the receiving agent.

Referring now to FIG. 1, shown is a block diagram of a system in accordance with one embodiment of the present invention. As shown in FIG. 1, system 10 includes a processor socket 20. Note that only a portion of system 10 is shown, specifically, that portion in the immediate vicinity of processor socket 20. In various implementations, system 10 may be a multiprocessor system, such as a dual processor system or a multiprocessor system including four or more processors. In these implementations, a motherboard or other support structure may include circuitry and socket interconnections to enable connection of processor sockets thereto. In the embodiment shown in FIG. 1, processor socket 20 is a multi-core processor. Specifically, processor socket 20 includes four cores 25a-d (generically core 25). While shown with four such cores in the embodiment of FIG. 1, it is to be understood that the scope of the present invention is not limited in this regard.

Referring still to FIG. 1, additional components may be present within processor socket 20. Specifically, as shown in FIG. 1 a plurality of interfaces may be present. Specifically, a first interface 30 and a second interface 35 may be present. Such interfaces may include protocol engines to act as an interface between cores 25 and to provide for communication according to a given communication protocol. In various embodiments, first interface 30 and second interface 35 may be reconfigurable such that both interfaces may communicate according to one of multiple protocols, or each interface may be configured with a different protocol. Such reconfigurability may be realized by providing multiple protocol engines in the interfaces and selecting a particular engine for use.

While the scope of the present invention is not limited in this regard, the communication protocols may include a CSI protocol and a Peripheral Component Interconnect (PCI) Express™ protocol in accordance with the PCI Express™ Specification Base Specification version 1.1 (published Mar. 28, 2005) (hereafter PCIe™ protocol). Of course, many other protocols are possible. For example, in some implementations at least one of the interfaces may be configured to communicate according to a memory communication protocol such as a fully buffered dual inline memory module (FBD) protocol, a double data rate (DDR) memory protocol or another such protocol.

To enable interfaces 30 and 35 to communicate according to different communication protocols, a common I/O buffer 40 may be present. Common buffer 40 may include a plurality of buffers or buffer sets to temporarily store information for transmission/reception along various interconnects to which processor socket 20 is coupled. That is, common buffer 40 may functionally act as a buffer for multiple protocols, under control of a given interface that may be operating according to one of the protocols. Thus common buffer 40 may be controlled to be coupled to a given one or both of first and second interfaces 30 and 35. In this way, common buffer 40 may be shared by multiple users.

As shown in FIG. 1, processor socket 20 may be coupled via a first interconnect 45 and a second interconnect 50 to other system components. The nature of the protocol with which communication occurs on interconnects 45 and 50 may depend on a particular system implementation in which processor socket 20 is located. For example, in some implementations both of interconnects 45 and 50 may be operated according to a CSI protocol. However in other implementations one or both interconnects 45 and 50 may be operated according to a PCIe™ protocol. Of course, other PTP or other such protocols are possible for communication.

Referring still to FIG. 1, processor socket 20 may be coupled to system memory, e.g., a dynamic random access memory (DRAM), which may include portions of main memory locally attached to processor socket 20. For example, in the embodiment of FIG. 1 a plurality of memory channels 55a-d (generically memory channels 55) and a plurality of memory channels 65a-d (generically memory channels 65) may couple processor socket 20 to closely coupled portions of a memory 60a-60h (generically memory 60), each of which may be a slot supporting memory. While shown with this particular implementation in the embodiment of FIG. 1, it is to be understood the scope of the present invention is not limited in this regard. For example, additional reconfigurable interfaces may be present in some embodiments.

To allow for even greater configurability of a system, embodiments may provide for a single processor socket to communicate using the configurable interfaces of the socket along various I/O slots, including slots of other unpopulated processor sockets. For example, in various multiprocessor systems such as a dual processor (DP) system or a multiprocessor system including four processor sockets, it is possible that one or more processor sockets are not present in a given configuration. However, to enable the fewer number of processor sockets to communicate along all I/O slots available in a system, embodiments may provide for a passive interposer to enable configurable interfaces within the populated processor sockets to communicate along I/O slots associated with the unpopulated sockets.

Figure 2:
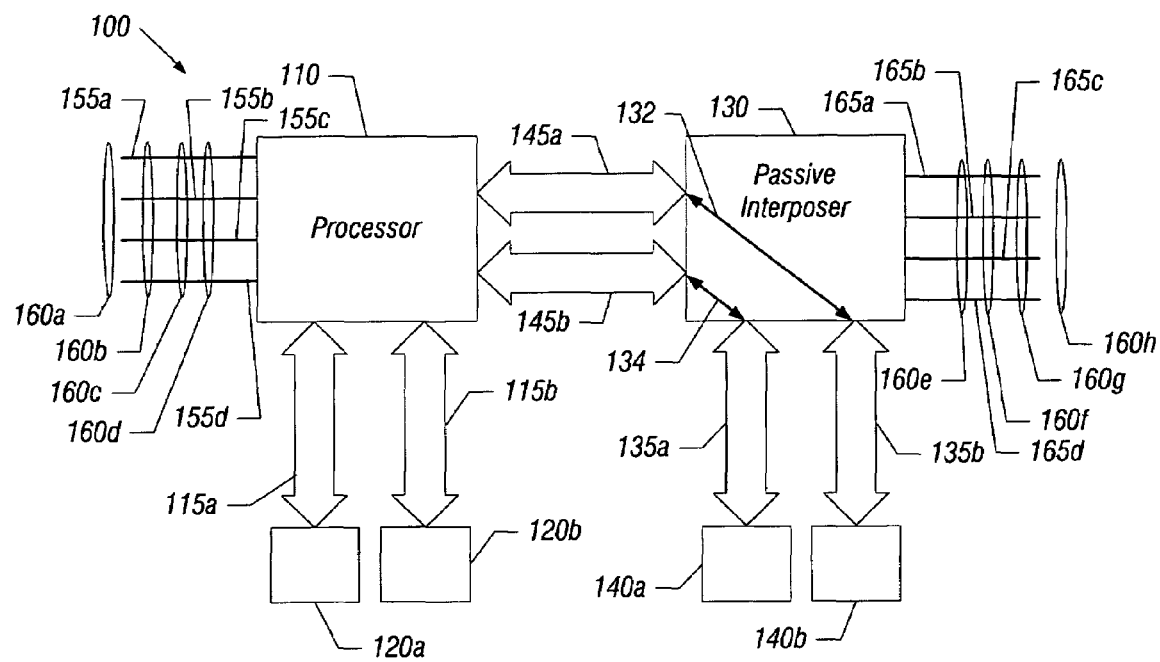
FIG. 2 is a block diagram of a system in accordance with another embodiment of the present invention.

Referring now to FIG. 2, shown is a block diagram of a system in accordance with another embodiment of the present invention. As shown in FIG. 2, a DP system 100 includes only a single processor 110 (also referred to as a processor socket). That is, while configured for a dual processor system, in a given implementation a system may include only one processor socket, although the system design (e.g., motherboard) includes a socket connection for another processor socket. To enable full I/O communication across all I/O slots of such a system, a passive interposer 130 may be coupled in the unpopulated processor socket. As shown in FIG. 2, passive interposer 130 may include interconnects 132 and 134. Such interconnects may enable electrical communication along interconnects 145a and 145b from processor socket 110 through passive interposer 130 to I/O interconnects 135a and 135b. Without such a passive interposer, communication along these I/O interconnects would not be possible in the absence of a second processor socket within system 100.

Note in the embodiment of FIG. 2, processor socket 110 may be coupled via interconnects 115a and 115b to various devices such as a first I/O device 120a and a second I/O device 120b. Instead of I/O devices, interconnects 115a and 115b may be coupled to slots, which in turn may be further interconnected to other components. Similarly, interconnects 135a and 135b may be coupled to I/O devices 140a and 140b. Furthermore, processor socket 110 may be coupled via memory channels 155a-155d to portions of memory 160a-160d and via interconnects 145a and 145b and through passive interposer 130 along memory channels 165a-165d to memory 160e-h. Note that for such connection from processor socket 110 to memory 160e-h, a differently configured passive interposer 130 may be present to provide interconnects from 145a and 145b to one or more memory channels 165a-d.

While described with these specifics in the embodiment of FIG. 2, it is to be understood that in various implementations a passive interposer may include a set of fixed interconnects to allow electrical communication between a processor socket to which the passive interposer is coupled via a first interconnect to a component coupled to the passive interposer via a second interconnect. Thus in a system having at least one unpopulated processor socket, a plurality of different passive interposers may be available to enable desired interconnections.

For example, in one embodiment a set of passive interposers may be made available for a given system implementation (e.g., motherboard) such that each interposer provides a direct passive connection to allow other components of the system to interconnect to one or more components that otherwise would be connected to a processor socket, if present. The passive interposer thus provides a physical mapping of I/O pins of a missing processor socket (i.e., an unpopulated socket) to enable interconnection of other components that would otherwise be connected to a processor socket (if present) to enable their connection to components coupled to the unpopulated processor socket.

In various implementations, a passive interposer may be formed using a printed circuit board (PCB) having traces or electrical lines thereon to enable the desired interconnections. In these embodiments, passive interposers may be relatively inexpensive, particularly compared with an active bridging device such as a silicon-based device including logic to enable switching of interconnections. However, the scope of the present invention is not limited in this regard and in other implementations other manners of providing desired interconnects are possible.

Accordingly, in the embodiment of FIG. 2, processor socket 110 may be configured to enable communication along all I/O slots of a system via use of a passive interposer and one or more configurable interfaces within processor socket 110. Note that in various implementations, mechanisms may be present to enable automatic detection and configuration of a processor socket in a given particular system configuration. For example, when processor socket 110 is initialized in system 100, it may determine its interconnection within other system components to provide for communication along interconnects 145a and 145b according to a particular communication protocol. For example, in the embodiment of FIG. 2 to enable communication with I/O devices 140a and 140b, which may be PCIe™ devices, processor socket 110 may configure one or more of its interfaces to enable communication across interconnects 145a and 145b according to a PCIe™ protocol. However, if passive interposer 130 is removed and a processor socket inserted, processor socket 110 may reconfigure the interface such that communication across interconnects 145a and 145b may be according to a CSI protocol, for example.

Various manners of enabling such configurations/reconfigurations may be realized. For example, various combinations of hardware, software, or firmware may be used to perform the configuration/reconfiguration. In some embodiments such activities may occur at boot time. Alternately, a hardwired configuration based on detection of particular devices in an environment may be implemented. Still further, other manners of enabling automatic configuration/reconfiguration may be realized. While described with this particular implementation in the embodiment of FIG. 2, it is to be understood the scope of the present invention is not limited in this regard.

Figure 3:
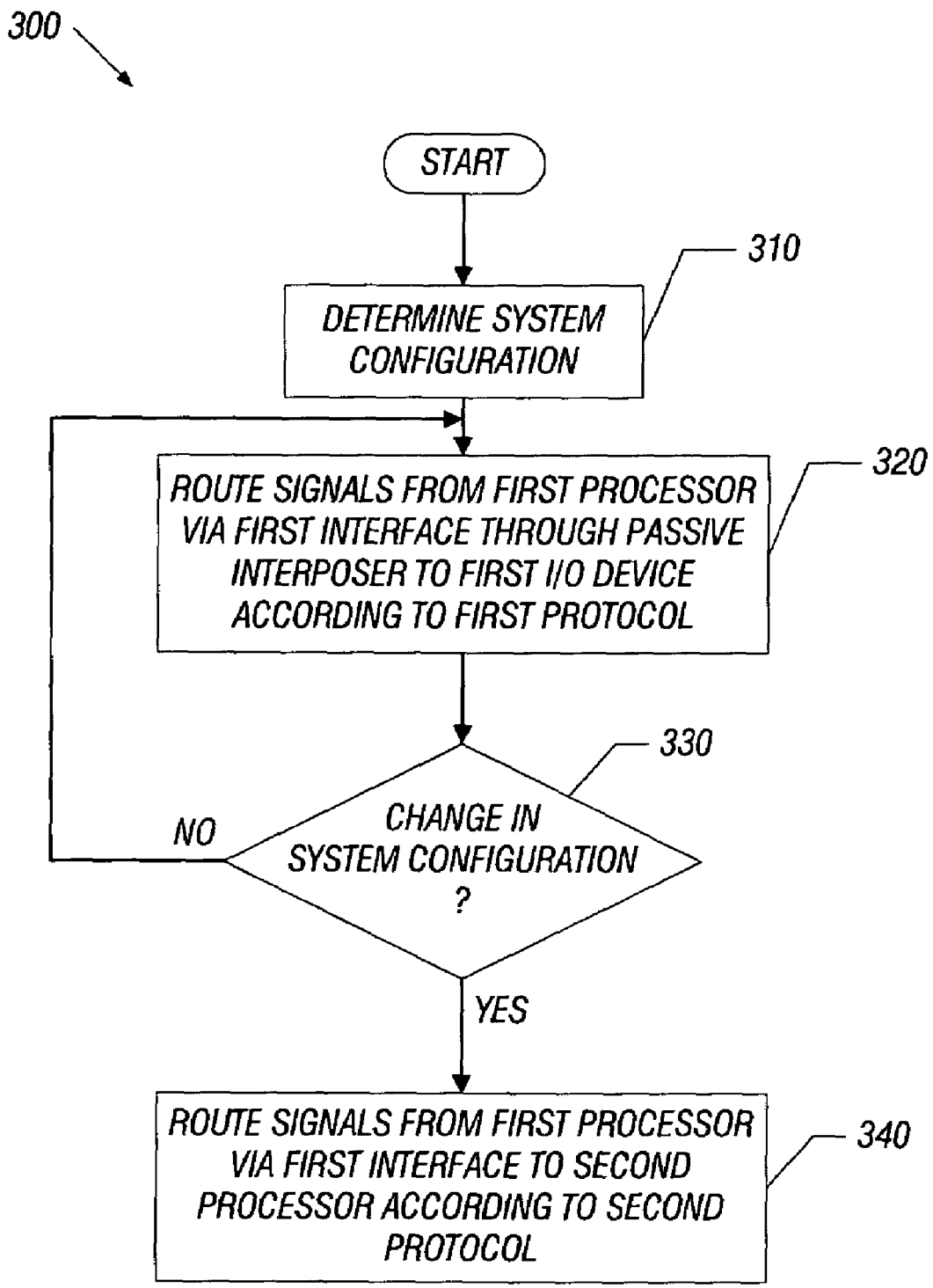
FIG. 3 is a flow diagram of a method in accordance with one embodiment of the present invention.

Referring now to FIG. 3, shown is a flow diagram of a method in accordance with one embodiment of the present invention. As shown in FIG. 3, method 300 may be used to initially configure a system (or reconfigure the same) and communicate signals in the system. Method 300 may begin by determining a system configuration (block 310). For example, a processor including one or more configurable interfaces in accordance with an embodiment of the present invention may determine to what devices it is coupled (e.g., one or more other processor sockets, a passive interposer in an unpopulated processor socket that in turn is coupled to an I/O device, or so forth). Based on the determination, the processor may configure one or more of its interfaces accordingly.

Referring still to FIG. 3, during system operation signals from the first processor may be routed via an interface of the processor configured for communication according to the first protocol and through a passive interposer (assuming such interposer is present) to a first I/O device coupled to the first interposer according to a first protocol (block 320). Thus when an unpopulated socket is instead adapted with a passive interposer, communication from the first processor may be according to a first protocol, e.g., a PCIe™ protocol.

Referring still to FIG. 3, during system operation, it may be determined whether there is a change in system configuration (diamond 330). For example, a hot-swappable processor may replace the passive interposer to enable greater processing capabilities in a given system. If it is determined that the system configuration is unchanged, control returns to block 320, discussed above. If instead is determined that there is a change in system configuration, control passes to block 340. While not shown in FIG. 3, it is to be understood that the first interface may be reconfigured in light of the changed system configuration. More specifically, the first interface may be reconfigured to enable communication according to a second protocol. Accordingly, at block 340, signals may be routed from the first processor via the first interface to a second, newly inserted processor according to a second protocol. While described with this particular implementation in the embodiment of FIG. 3, the scope of the present invention is not limited in this regard.

Figure 4:
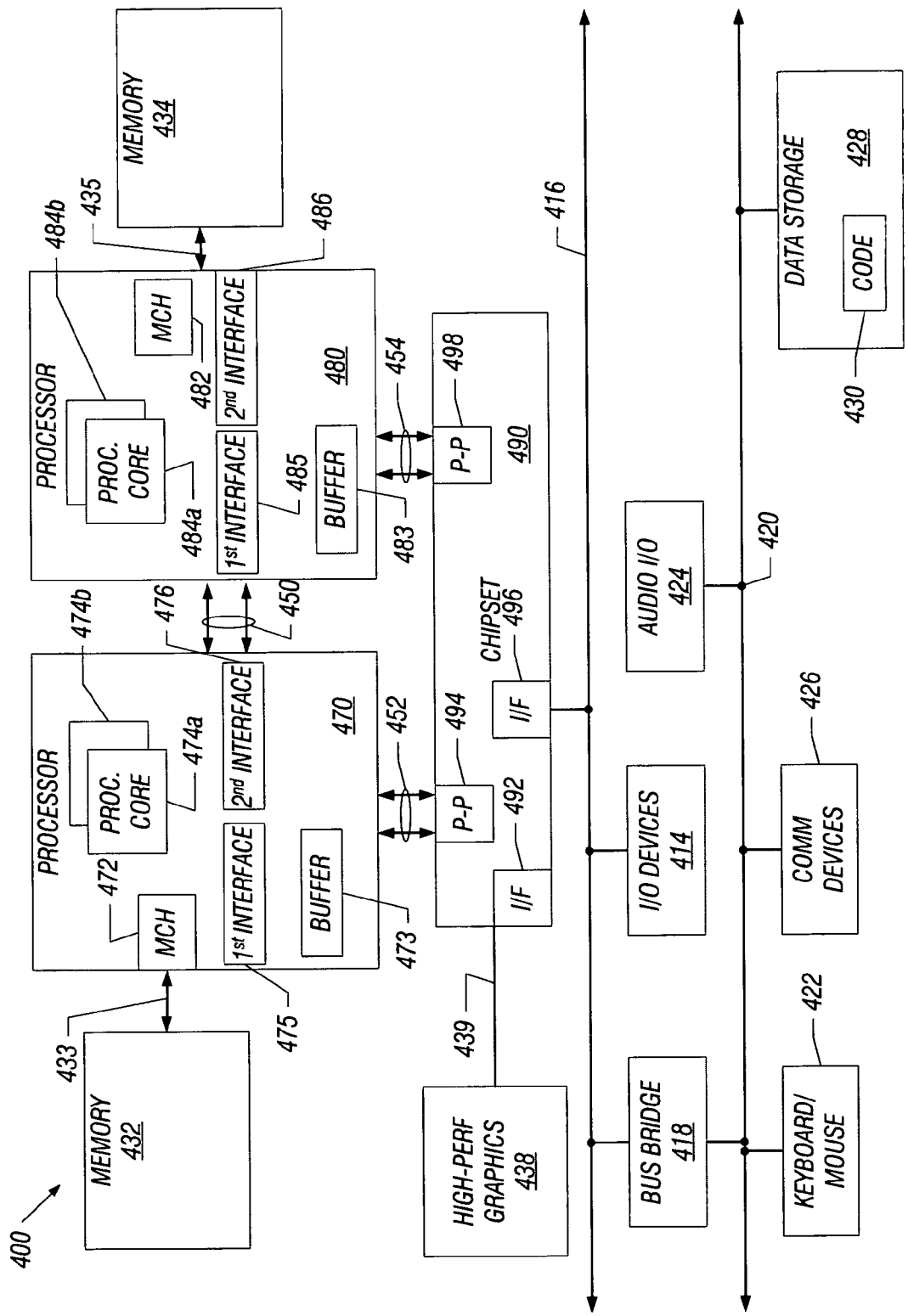
FIG. 4 is a block diagram of a multiprocessor system in accordance with an embodiment of the present invention.

Embodiments may be implemented in many different system types. Referring now to FIG. 4, shown is a block diagram of a multiprocessor system in accordance with an embodiment of the present invention. As shown in FIG. 4, multiprocessor system 400 is a DP system. Specifically, a first processor 470 and a second processor 480 are coupled via a point-to-point interconnect 450. As shown in FIG. 4, each of processors 470 and 480 may be multicore processors, including first and second processor cores (i.e., processor cores 474a and 474b and processor cores 484a and 484b). First processor 470 includes a first interface 475 and a second interface 476, and second processor 480 includes a first interface 485 and a second interface 486. Such interfaces in accordance with an embodiment of the present invention may be reconfigurable to enable communication according to different protocols. First and second processors 470 and 480 may further include common buffers 473 and 483. First processor 470 further includes a memory controller hub (MCH) 472, and second processor 480 includes a MCH 482. As shown in FIG. 4, MCH's 472 and 482 couple the processors to respective portions of memory, namely a memory 432 and a memory 434 coupled to the processors via memory channels 433 and 435, respectively.

First processor 470 and second processor 480 may be coupled to a chipset 490 via one of the respective first and second interfaces of the processor via interconnects 452 and 454. As shown in FIG. 4, chipset 490 includes PTP interfaces 494 and 498. Furthermore, chipset 490 includes an interface 492 to couple chipset 490 with a high performance graphics engine 438. In one embodiment, a point-to-point interconnect 439 may couple these components. In turn, chipset 490 may be coupled to a first bus 416 via an interface 496.

As shown in FIG. 4, various input/output (I/O) devices 414 may be coupled to first bus 416, along with a bus bridge 418, which couples first bus 416 to a second bus 420. Second bus 420 may be a low pin count (LPC) bus. Various devices may be coupled to second bus 420 including, for example, a keyboard/mouse 422, communication devices 426 and a data storage unit 428 which may include code 430, in one embodiment. Such code may be used, for example, to enable configuration/reconfiguration of the interfaces of processors 470 and 480 based on system configuration. Further, an audio I/O 424 may be coupled to second bus 420. Note that other architectures are possible. For example, instead of the point-topoint architecture of FIG. 4, a system may implement a multi-drop bus or another such architecture.

Embodiments may be implemented in code and may be stored on a machine-readable storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a passive interposer including at least a first direct passive interconnect and a second direct passive interconnect, wherein the passive interposer is to be coupled to an unpopulated socket of a system, wherein the passive interposer is to route signals from a first processor of the system through the first direct passive interconnect to a device coupled to the unpopulated socket via a first interconnect separate from the first direct passive interconnect and from the first processor through the second direct passive interconnect to a main memory locally coupled to the unpopulated socket via a second interconnect separate from the second direct passive interconnect, wherein the first processor is to determine a change in configuration of the system, and responsive to the determination to reconfigure a first interface therein from a first protocol to enable communication of the signals to the device to a second protocol to enable communication of second signals to a second processor when the system is reconfigured to include the second processor in place of the passive interposer, the first interface including a first protocol engine to communicate according to the first protocol and a second protocol engine to communicate according to the second protocol.

2. The apparatus of claim 1, wherein the passive interposer comprises a circuit board.

3. The apparatus of claim 1, wherein the second direct passive interconnect of the passive interposer is to route the signals from the first processor to the main memory according to a fully buffered memory communication protocol.

4. The apparatus of claim 1, further comprising a set of passive interposers for a motherboard of the system, wherein each of the set of passive interposers has a different configuration of at least one direct passive interconnect, wherein each of the passive interposers is to be coupled to the unpopulated socket, and is to enable communication between the first processor and a different device.

5. The apparatus of claim 4, wherein the at least one direct passive interconnect of each of the plurality of passive interposers comprises a fixed non-switchable interconnect.

6. A method comprising:
routing signals from a first processor of a system via a first interconnect through a first direct passive connection of a passive interposer coupled to the first interconnect to a device coupled to the passive interposer via a second interconnect and routing second signals from the first processor via a third interconnect through a second direct passive connection of the passive interposer coupled to the third interconnect to a main memory locally coupled to the passive interposer via a fourth interconnect;
determining presence of the passive interposer;
configuring a reconfigurable interface of the first processor, the reconfigurable interface including a first protocol engine and a second protocol engine, to communicate according to a first protocol using the first protocol engine based on the presence of the passive interposer;
determining insertion of a second processor in place of the passive interposer, the second processor being hot swappable; and
reconfiguring the reconfigurable interface of the first processor to communicate according to a second protocol using the second protocol engine based on the presence of the second processor.

7. The method of claim 6, further comprising routing the signals through a common buffer of the first processor coupled to the reconfigurable interface and a second interface, wherein the common buffer is to temporarily store data that is to be transmitted according to the first protocol or the second protocol.

8. A system comprising:
a first processor having a first interface to process data for communication according to at least a first protocol and a second protocol, a second interface to process data for communication according to at least a memory communication protocol, and a common buffer coupled to the first and second interfaces and including a plurality of buffers to store information associated with the first and second interfaces, the common buffer to be controlled to be coupled to one or both of the first and second interfaces and to transmit or receive the information via interconnects coupled to the first processor, the first processor coupled to a first socket of the system;
a first passive interposer including at least a first direct passive interconnect, wherein the first passive interposer is coupled to an unpopulated socket of the system, wherein the first passive interposer is to route signals from the first processor to a first input/output (I/O) device coupled to the first passive interposer via a second interconnect, the first passive interposer coupled to the first processor via a first interconnect separate from the first direct passive interconnect; and
a dynamic random access memory (DRAM) coupled to the passive interposer via a third interconnect, wherein the first passive interposer includes a second direct passive interconnect to couple the first processor to the DRAM, wherein the first processor is to communicate with the DRAM according to the memory communication protocol.

9. The system of claim 8, wherein the first passive interposer is to couple the first processor to the first I/O device, wherein the first processor is to communicate with the first I/O device according to the first protocol.

10. The system of claim 9, further comprising a second passive interposer, wherein the second passive interposer, when located in the unpopulated socket in place of the first passive interposer, is to couple the first processor to the DRAM, wherein the first processor is to communicate with the DRAM according to the memory communication protocol.

11. The system of claim 8, wherein the first processor is to determine a change in configuration of the system, and responsive to the determination to reconfigure the first interface to the second protocol to enable communication of second signals to a second processor when the system is reconfigured to include the second processor in place of the first passive interposer.

\* \* \* \* \*